United States Patent
Jauernig et al.

(10) Patent No.: US 11,982,312 B2
(45) Date of Patent: May 14, 2024

(54) SEGMENT BEARING DEVICE HAVING OFFSET MOUNTING ROLLING ELEMENT AND PIVOT LEVER ARRANGEMENT HAVING SAID SEGMENT BEARING DEVICE

(71) Applicant: Schaeffler Technologies AG & Co. KG, Herzogenaurach (DE)

(72) Inventors: Dieter Jauernig, Herzogenaurach (DE); Robert Dressel, Gremsdorf (DE); Richard Frisch, Obermichelbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 80 days.

(21) Appl. No.: 17/798,559

(22) PCT Filed: Jan. 12, 2021

(86) PCT No.: PCT/DE2021/100028
§ 371 (c)(1),
(2) Date: Aug. 10, 2022

(87) PCT Pub. No.: WO2021/160203
PCT Pub. Date: Aug. 19, 2021

(65) Prior Publication Data
US 2023/0079618 A1    Mar. 16, 2023

(30) Foreign Application Priority Data

Feb. 12, 2020   (DE) .................... 10 2020 103 621.3

(51) Int. Cl.
*F16C 19/50* (2006.01)
*F16C 33/46* (2006.01)
(Continued)

(52) U.S. Cl.
CPC ........ *F16C 19/502* (2013.01); *F16C 33/4605* (2013.01); *F16C 33/4635* (2013.01);
(Continued)

(58) Field of Classification Search
CPC ................. F16C 19/502; F16C 33/4605; F16C 33/4635; F16C 33/585; F16C 41/04; F16C 2361/45; F16D 65/14
See application file for complete search history.

(56) References Cited

U.S. PATENT DOCUMENTS

| | | | |
|---|---|---|---|
| 8,632,256 B2 * | 1/2014 | Katayama | F16C 33/4635 384/560 |
| 2017/0204903 A1 * | 7/2017 | Klaas | F16D 55/226 |

FOREIGN PATENT DOCUMENTS

| | | |
|---|---|---|
| CN | 106030131 A | 10/2016 |
| DE | 102013211447 A1 | 12/2014 |

(Continued)

*Primary Examiner* — Phillip A Johnson

(57) ABSTRACT

A segment bearing device for supporting a first bearing partner relative to a second bearing partner about a pivot axis (S) includes a plurality of rolling elements, a segment cage for receiving the rolling elements, and a partial shell, the partial shell providing a race for the rolling elements. At least one of the plurality of rolling elements is arranged as a mounting rolling element in a first partial circle (TK1) in an operating state of the segment bearing device, and is held in a second partial circle (TK2) in a mounted state of the segment bearing device. The common center point of the partial circles (TK1, TK2) is defined by a center of curvature of the segment cage, and the first partial circle (TK1) has a smaller diameter than the second partial circle (TK2).

20 Claims, 4 Drawing Sheets

(51) Int. Cl.
  *F16C 33/58* (2006.01)
  *F16C 41/04* (2006.01)
(52) U.S. Cl.
  CPC ............ *F16C 33/585* (2013.01); *F16C 41/04* (2013.01); *F16C 2361/45* (2013.01)

(56) References Cited

FOREIGN PATENT DOCUMENTS

| | | | |
|---|---|---|---|
| DE | 102014100561 A1 | 7/2015 | |
| DE | 102014112241 A1 | 3/2016 | |
| DE | 102014112249 A1 * | 3/2016 | ............ F16C 19/502 |
| DE | 102016218412 A1 | 10/2017 | |
| DE | 102016218410 A1 | 3/2018 | |
| EP | 2354577 A2 * | 8/2011 | ............ F16C 19/502 |
| EP | 2647865 A2 * | 10/2013 | ............ F16C 19/502 |
| EP | 2995826 A2 | 3/2016 | |
| EP | 3214325 A1 * | 9/2017 | ............ F16C 19/502 |
| FR | 2831622 A1 | 5/2003 | |
| JP | H03277809 A | 12/1991 | |
| JP | 200484705 A | 3/2004 | |
| JP | 2004144183 A | 5/2004 | |
| JP | 2008164072 A | 7/2008 | |
| JP | 2017166591 A1 | 9/2017 | |

\* cited by examiner

SEGMENT BEARING DEVICE HAVING OFFSET MOUNTING ROLLING ELEMENT AND PIVOT LEVER ARRANGEMENT HAVING SAID SEGMENT BEARING DEVICE

CROSS-REFERENCE TO RELATED APPLICATIONS

This application is the United States National Phase of PCT Appln. No. PCT/DE2021/100028 filed Jan. 12, 2021, which claims priority to German Application No. DE102020103621.3 filed Feb. 12, 2020, the entire disclosures of which are incorporated by reference herein.

TECHNICAL FIELD

The present disclosure relates to a segment bearing device and to a pivot lever arrangement with this segment bearing device.

BACKGROUND

Usually, rolling bearings permit a relative rotation of the bearing partners with respect to one another without a limit to the rotational angle. In some applications, however, only a pivoting of bearing partners relative to one another should be supported. In applications of this kind, it is sufficient for the rolling bearing to not extend over 360° and instead to be limited to a partial angular range.

In mounting such rolling bearings, it can be advantageous if a cage of the rolling bearing is immobilized in the rolling bearing. The rolling bearing thus has a defined state and can be better mounted as a result.

The publication DE102013 211 447 A1 discloses a half-shell bearing with a bearing shell and a cage with rolling elements rolling on the bearing shell, wherein the cage, which is accommodated in the bearing shell in a radially secured manner, can be pivoted relative to the bearing shell. The cage can be fixed in a detachable manner to the bearing shell in a transport position by holding means provided on it.

SUMMARY

The present disclosure provides an improved mounting safeguard for a segment bearing device. The disclosure also provides a segment bearing device which serves to support a first bearing partner relative to a second bearing partner, namely about a pivot axis. The segment bearing device may be used in a pivot lever arrangement for a disc brake, which is described below.

The segment bearing device has a plurality of rolling elements. The rolling elements may be designed as rollers, e.g., as pins. The rolling elements may be made of metal.

The segment bearing device has a segment cage for receiving the rolling elements. The rolling elements may be arranged in a single row in the segment cage. In alternative embodiments, they can also be arranged in two or more rows.

The segment cage may have receptacles for the rolling elements. It can be provided that the rolling elements are held captive in the segment cage. The rolling elements in the segment cage may be arranged in a full complement of rollers to increase the load-carrying capacity.

The segment bearing device and/or the segment cage and/or the plurality of rolling elements extend over an angular segment which may be smaller than 200°, e.g., smaller than 180° or smaller than 135°. Due to this limited extension in the direction of rotation, it can be achieved that the segment bearing device is designed only for a pivoting movement, but not for a rotational movement, e.g., for an endless rotational movement.

The segment bearing device has a partial shell, e.g., a half shell, wherein the partial shell provides a race for the rolling elements. The partial shell may guide the segment cage in the axial direction and has guide flanges for this purpose. The partial shell may be formed as a shaped sheet metal part. In this embodiment, the race for the rolling elements is designed as a metallic race and is therefore very resilient. The guide flanges may be designed as formed regions of the shaped sheet metal part. The guide flanges may be designed to run straight in the radial direction and/or extend exclusively in a radial plane to the pivot axis.

At least one of the rolling elements may assume the function of a mounting rolling element. The mounting rolling element is arranged on different partial circles depending on the state of the segment bearing device. The partial circle is defined as the circle defined by the distance of an axis of rotation of the rolling element, e.g., the mounting rolling element, from a center of curvature of the segment cage. The mounting rolling element may be arranged in a first partial circle in an operating state of the segment bearing device, for example in an installed state, e.g., under load. In a mounted state, however, the mounting rolling element is held in a second partial circle. In this context, "held" means that means are provided which hold the mounting rolling element in the second partial circle during mounting, e.g., hold it as intended.

The first partial circle has a smaller diameter than the second partial circle. In other words, the mounting rolling element in the mounted state is arranged offset outward in the radial direction relative to the segment cage compared to the operating state. The mounting rolling element in the mounted state may be arranged offset outward in the radial direction relative to the segment cage compared to the operating state. In the mounted state, the mounting rolling element thus assumes a position in the segment cage that is offset radially outward with respect to the center of curvature compared to the position of the mounting rolling element in the operating state. For example, the mounting rolling element is held in the segment cage in the mounted state by the segment cage in the second partial circle. In the mounted state, at least one, some, or the majority of the other rolling elements may be located in the first partial circle. Thus, the mounting rolling element is held offset radially outward from the other rolling elements, e.g., in the segment cage.

The offset of at least one mounting rolling element ensures that the segment bearing device is immobilized. For example, pivoting of the segment cage with the rolling elements relative to the partial shell is prevented or at least braked. This implements an effective mounting safeguard for the segment bearing device.

In an example embodiment, the mounting rolling element is clamped in the segment cage in the mounted state. The mounting rolling element is thus held such that it has increased friction in the second partial circle relative to the segment cage. Due to the clamping and the resulting increased friction, the segment bearing device is immobilized and the mounting safeguard is improved.

In an alternative embodiment, the partial shell has a mating section, wherein the segment cage is pressed away from the race of the partial shell and against the mating section by the mounting rolling element. In this embodiment, the segment cage is alternatively or additionally clamped between the race and the mating section. The mounting rolling element is supported on the race and presses the segment cage radially inward so that it comes into contact with the mating section in a clamping manner. Due to the clamping and the resulting increased friction, the segment bearing device is immobilized and the mounting safeguard is improved.

In an example embodiment, at least one of the receptacles for the rolling elements is designed as a mounting receptacle for receiving the mounting rolling element. It is provided that the mounting receptacle has holding members to hold the mounting rolling element in the second partial circle. For example, the holding members support the mounting rolling element in the radial direction so that it is held in the second partial circle. The holding members can be designed in the form of holding lugs, for example, wherein the mounting receptacle may have four such holding lugs.

However, the function of the holding members is to be limited to the mounted state, so that the mounting receptacle without the holding members may be of identical construction to the other receptacles. This provides the same constructive environment for each of the rolling elements, including the at least one mounting rolling element.

The holding members may be designed in such a way that they are deactivated by the mounting rolling element in the operating state. This can be achieved, for example, by forming, e.g., by flattening, and/or by separating, e.g., grinding, the holding members.

The segment cage may be designed as a plastic cage. For example, the segment cage with the holding members is manufactured in a common injection mold, especially as a common plastic component.

In an example embodiment, the segment bearing device has a pivot lock, wherein the pivot lock has a groove contour on an axial end face of the segment cage and a locking member on the partial shell, which can engage in a locking manner. For example, the groove contour can be molded or formed into the segment cage. The locking member can be provided in the partial shell by forming and can be realized, for example, as a lug or the like.

The groove contour under the locking member may be formed in such a way that the groove contour is separable by the locking member. Thus, the pivot lock only forms a mounting safeguard and is deactivated during operation of the segment bearing device. The separation can be achieved by the groove contour being made of the base material of the segment cage, e.g., plastic, and the locking member being made of the base material of the partial shell, e.g., metal, so that the latter is considerably harder than the groove contour. If the groove contour is traversed several times by the locking member, the groove contour is cut by the locking member and thus separated. In an example embodiment, the segment cage is configured to be symmetrical with respect to the installation direction. This implements a poka-yoke concept. The groove contour may be arranged centrally and on both axial sides of the segment cage. Similarly, the locking member may be arranged on both axial sides of the partial shell.

The present disclosure also provides a pivot lever arrangement for a disc brake, e.g., for a commercial vehicle. The pivot lever arrangement is used to transmit a braking force from an actuator, such as a pneumatic cylinder, to a brake shoe with a brake pad.

The pivot lever arrangement has a pivot lever as a first bearing partner. The braking force may be transmitted via the pivot lever. The pivot lever is arranged so as to be pivotable about a pivot axis. Furthermore, the pivot lever arrangement has a counter-bearing section as a second bearing partner. For example, the pivot lever is connected to the actuator by a transmission. The first bearing partner is supported relative to the second bearing partner with or via a segment bearing device. The segment bearing device is designed as described above. In one possible implementation of the pivot lever arrangement, it has two such segment bearing devices.

BRIEF DESCRIPTION OF THE DRAWINGS

Further features, advantages and effects of the invention result from the following description of an exemplary embodiment and the attached figures. In the figures.

DETAILED DESCRIPTION

Figure 1:
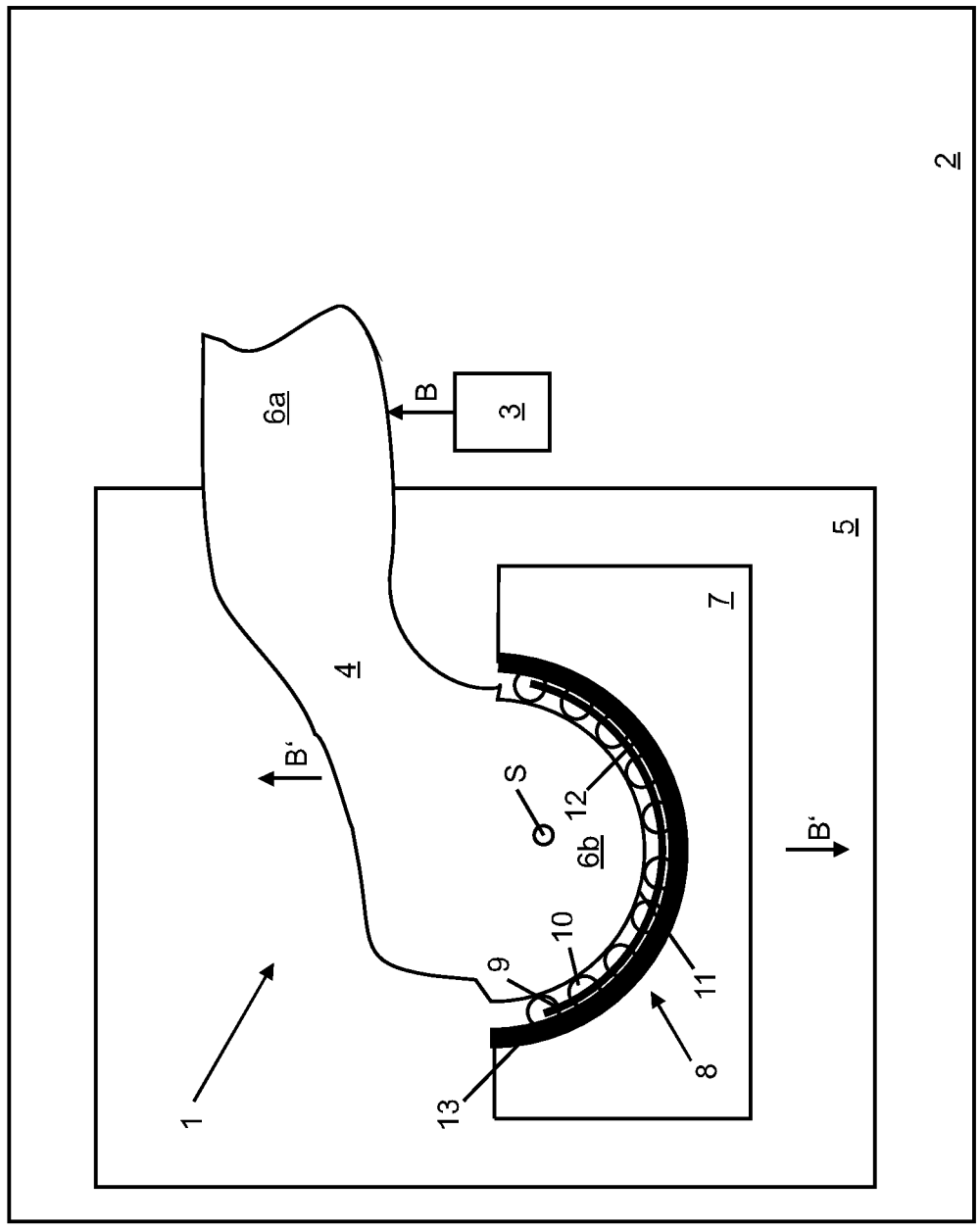
FIG. 1 shows a schematic representation of a pivot lever arrangement as an exemplary embodiment.

FIG. 1 shows a schematic side view of a pivot lever arrangement 1 for a disc brake 2, which is only shown as a block, for a commercial vehicle as an exemplary embodiment. The pivot lever arrangement 1 has the function of deflecting a braking force B introduced by an actuator 3 and, if necessary, translating it and passing it on as translated braking force B' in the direction of the brake shoes or brake pads.

The pivot lever arrangement 1 has a pivot lever 4, which is pivotably supported in a brake caliper 5 via a pivot axis S. The pivot lever 4 has a free end 6a, which is engaged by the actuator 3, for example designed as a hydraulic or pneumatic actuator 3. At one pivot end 6b, the pivot lever 4 is pivotably supported about the pivot axis S. The pivot lever 4 is pivotably supported relative to a counter-bearing section 7, so that the pivot lever 4 forms a first bearing partner and the counter-bearing section 7 forms a second bearing partner.

A segment bearing device 8 is arranged between the pivot lever 4 and the counter-bearing section 7, which has a segment cage 9 and a plurality of rolling elements 10, wherein the rolling elements 10 are guided in the cage segment 9. The cage segment 9 extends around the pivot axis S in an angular range of less than 180 degrees. The counter-bearing section 7 can form part of the brake caliper 5, wherein the translated braking force B' is then transmitted via a region of the pivot lever 4 opposite the segment bearing device 8, for example via a bridge. Alternatively, the counter-bearing section 7 forms a pressure piece so that the translated braking force B' is transmitted from the pressure piece in the direction of the brake shoes.

The segment bearing device 8 has a partial shell 13, which is designed as a half shell and which is arranged on the counter-bearing section 7. The pivot lever 4 forms a first race 11, the partial shell 13 forms a second race 12 for the rolling elements 10. The races 11, 12 are, for example, an integral part of the pivot lever 4 or the partial shell 13. The rolling elements 10 may be made of metal for transmitting the braking forces. The rolling elements 10 may be designed as cylindrical rollers, e.g., as pins. On the other hand, the segment cage 9 may be made of a plastic material, as it only has to introduce and deflect lesser forces.

Figure 2:
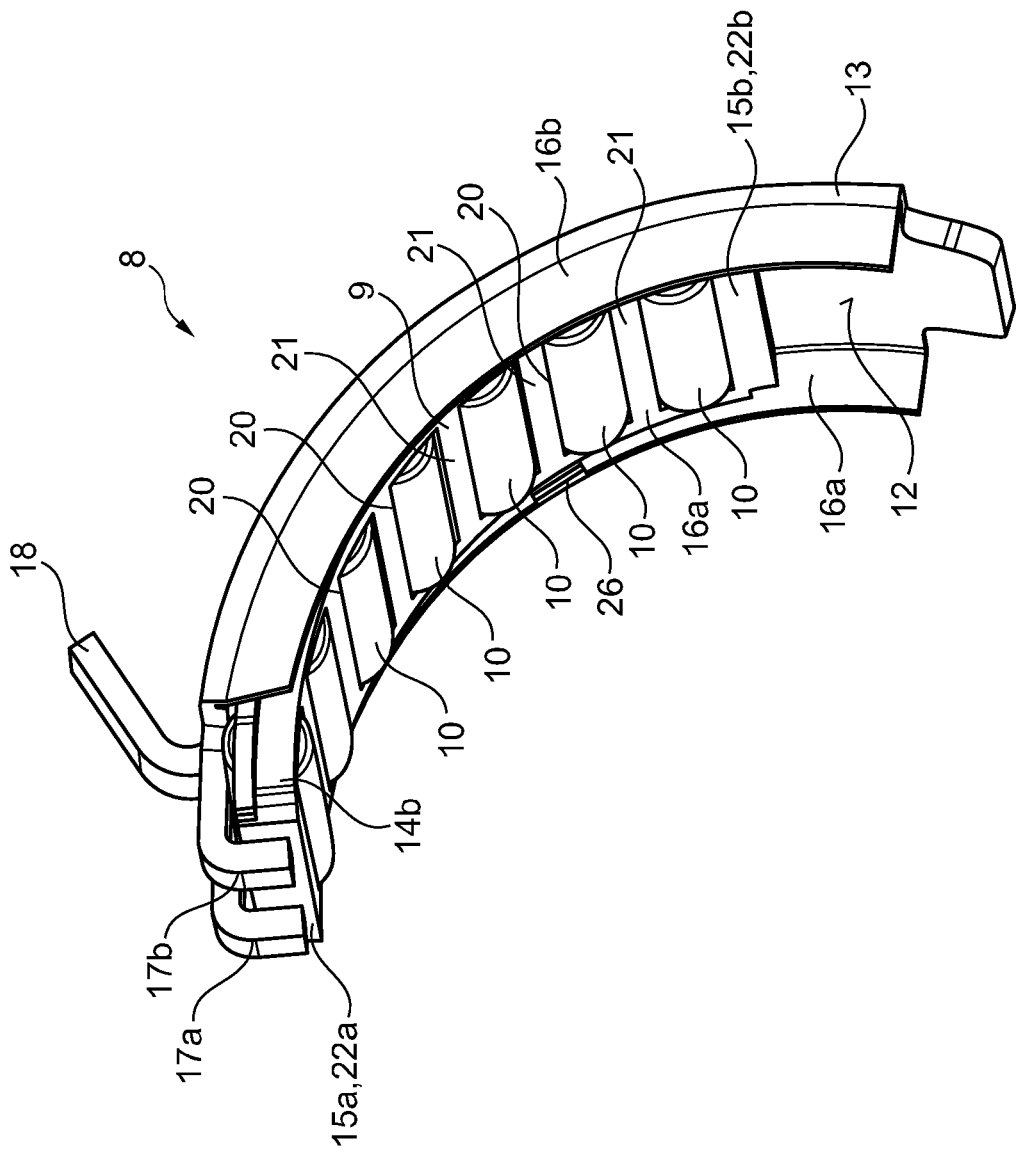
FIG. 2 shows a schematic three-dimensional representation of the segment bearing device.

FIG. 2 shows a three-dimensional representation of the segment bearing device 8 from FIG. 1 in an axial view. It can be seen that the partial shell 13 is formed as a shaped sheet metal part. The partial shell 13 provides the second race 12 for the rolling elements 10 on the inner circumference. The partial shell 13 provides the second race 12 for more than 150° and less than 180° in the direction of rotation about the pivot axis S. Guide flanges 16a, b for the segment cage 9 are provided on the axial sides and extend over the entire course of the partial shell 13 in the direction of rotation. The guide flanges 16a, b are designed as formed regions of the partial shell 13. Stop members 17a, b, in this exemplary embodiment formed as integrally formed hooks, are arranged on one end face of the partial shell 13 and form an end stop for the segment cage 9. On the other side, the partial shell 13 is designed to be free of stops so that the segment cage 9 can be mounted in the partial shell 13 in a simple manner. A lug section 18, designed as a tab, is formed on the side of the stop members 17a, b, which is used for mounting the partial shell 13 and/or the segment bearing device 8.

The segment cage 9 is arranged in the partial shell 13. The segment cage 9 extends in the direction of rotation over a partial region of the partial shell 13, so that it can be moved relative to the partial shell 13 in the direction of rotation about the pivot axis S. The segment cage 9 is made of plastic and has a plurality of receptacles 20 for the rolling elements 10. The rolling elements 10 are arranged in a full complement of rollers in the segment cage 9 so that a high load-carrying capacity is achieved in respect of the available installation space.

The segment cage 9 has a side ring region 14a, b on each of the axial end sides. Intermediate webs 21 extend between the side ring regions 14a, b and delimit the receptacles 20 for the rolling elements 10 in the direction of rotation. The segment cage 9 has end regions 15a, b at the end sides in the direction of rotation, wherein end webs 22a, b are formed in the end regions 15a, b. The end webs 22a, b delimit the last receptacle 20 in the direction of rotation and are arranged parallel to the intermediate webs 21 in this exemplary embodiment.

Figure 3:
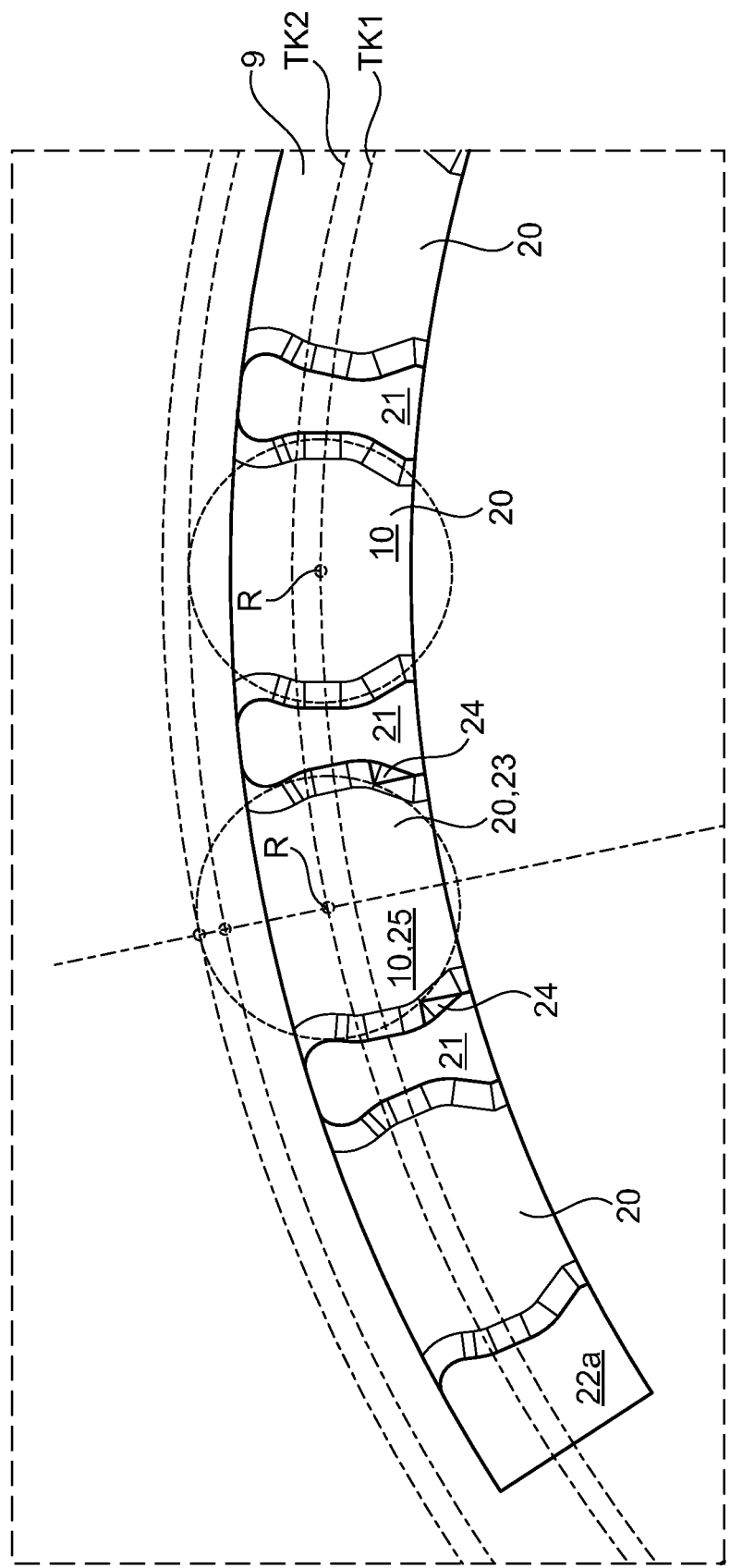
FIG. 3 shows a schematic cross-sectional view through the segment cage of the segment bearing device of the previous figures.

FIG. 3 shows a schematic cross-section of the segment cage 9, wherein several receptacles 20 for rolling elements 10 can be seen. The contours in the basic shape of the receptacles 20 are identical in construction in each case. The right rolling element 10 defines a first partial circle TK1 with its axis of rotation R, wherein the first partial circle TK1 is arranged coaxially with a center of curvature of the segment cage 9. In the operating state, the center of curvature of the segment cage 9 corresponds to the pivot axis S. The right rolling element 10 is arranged as all rolling elements 10 are positioned in an operating state 10.

The center receptacle 20 is designed as a mounting receptacle 23 and is distinguished from the other receptacles 20 by holding members 24. The rolling element 10 is arranged in the mounting receptacle 23, which assumes the function of a mounting rolling element 25. The mounting rolling element 25 defines a second partial circle TK2 with its axis of rotation R, wherein the second partial circle TK2 is arranged coaxially with the center of curvature of the segment cage 9. The second partial circle TK2 has a larger diameter than the first partial circle TK1. Due to the holding members 24, the mounting rolling element 25 is offset radially outward with respect to the segment cage 9 and is held in this position by the holding members 24. Radially on the outside, the mounting rolling element 25 is pressed against end regions of the intermediate webs 21, so that the mounting rolling element 25 is clamped in the segment cage 9 and can thus either only rotate in the segment cage 9 under friction load or not at all. The holding members 24 may not be integrated into receptacles 20 adjacent to the end webs 22a, b.

In the mounted state of the segment cage 9 or the segment bearing device 8 shown, the mounting rolling element 25 is in contact with the second race 12. The other rolling elements 10, on the other hand, are spaced apart from the second race 12. After the mounting rolling element 25 is clamped in the segment cage 9 and the further rolling elements 10 are at least partially or even completely lifted off the race 12, the segment cage 9 can no longer roll over the rolling elements 10 on the partial shell 13, so that the segment cage 9 is immobilized relative to the partial shell 13.

The mounting rolling element 25 is offset radially outward with respect to the segment cage 9 by the holding members 24. When the segment bearing device 8 or the segment cage 9 is transferred to the operating state, the mounting rolling element 25 is pressed radially inward relative to the segment cage 9. This deforms the holding members 24 so that the mounting rolling element 25 is also located on the first partial circle TK1. The holding members 24 are designed such that they also wear out over time in operation, so that they do not affect the rotation of the mounting rolling element 25 about its own axis of rotation.

For example, the holding members 24 may have an axial width of less than 1 mm, e.g., less than 0.5 mm. The radial offset of the mounting rolling element 25 compared to the other rolling elements 10 is also less than 1 mm, e.g., less than 0.5 mm, but more than 0.2 mm. For example, the radial offset may be 0.4 mm.

As can again be seen in FIG. 2, the partial shell 13 has a mating section 26, wherein the segment cage 9 is pressed in the radial direction against the mating section 26 in the mounted state of the segment bearing device 8, so that the segment cage 9 on the one hand cannot fall out in the radial direction and on the other hand is immobilized in the direction of rotation. The mating section 26 can extend to a small angular section of less than 30°, for example. The mating section 26 can be provided on one or both axial sides of the partial shell 13. For example, a clamping connection is formed, wherein starting from the second race 12, the mounting rolling elements 25, the holding members 24 and the segment cage 9 is pressed against the mating section 26 and thereby clamped.

Figure 4:
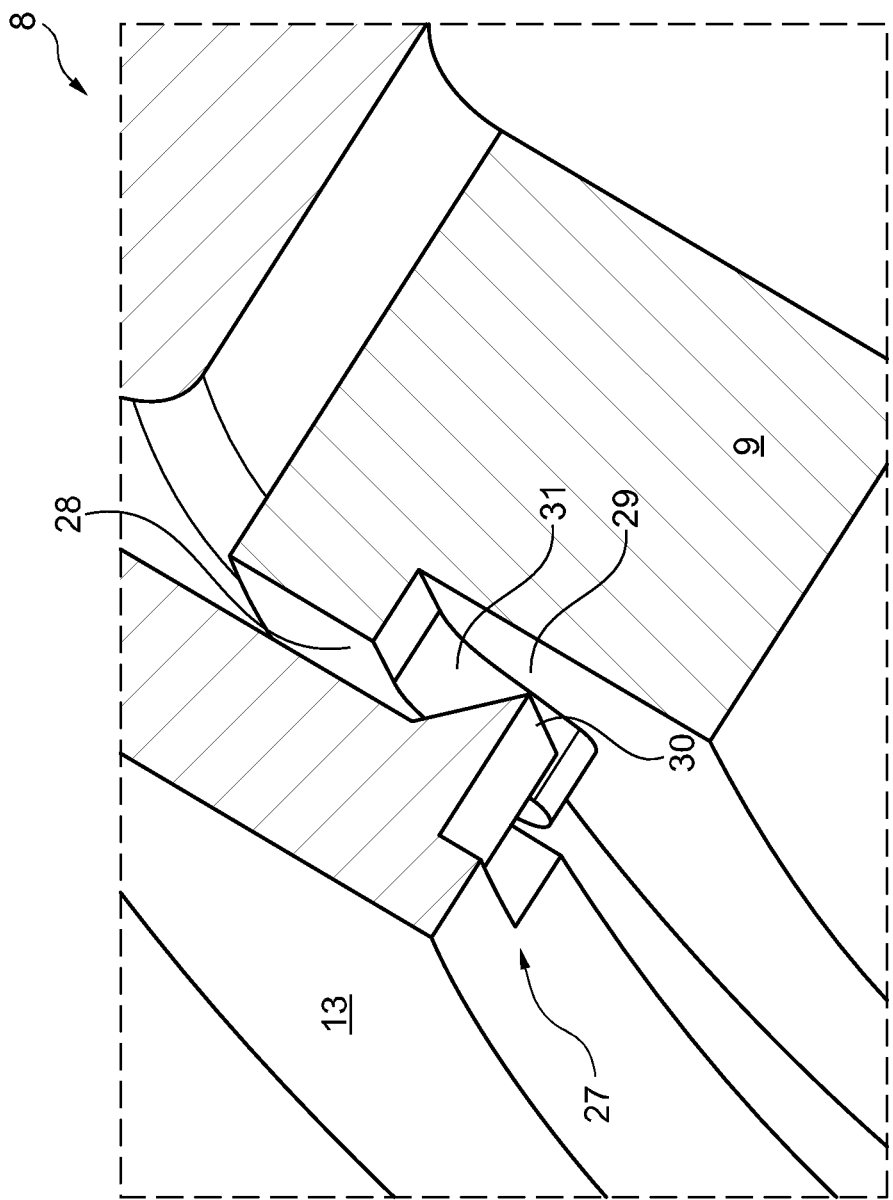
FIG. 4 shows a detail from FIG. 2 in a partial section.

FIG. 4 shows a three-dimensional partial sectional view of a pivot lock 27, which forms a supplementary mounting safeguard. The pivot lock 27 has a groove contour 28, wherein a groove 29 extends in the axial direction and is limited on both sides in the direction of rotation by a groove wall section 31 (only one groove wall section 31 is shown in FIG. 4). The groove contour 28 is formed on an axial side wall of the segment cage 9. A locking member 30 is formed on the partial shell 13, which engages in the groove contour 28, e.g., in the groove 29, in the mounted state. The form-fitting engagement of the locking member 30 in the groove contour 28 results in a lock for the segment cage 9 in the direction of rotation relative to the partial shell 13. In further operation, the locking member 30 passes through the groove wall section 31 several times and separates it, so that this mounting safeguard is deactivated in the course of operation.

On the one hand, the groove contour 28 may be arranged on both axial sides of the segment cage 9 under the locking member 30 on both axial sides of the partial shell 13. Furthermore, the groove contour 28 may be arranged centrally on the segment cage 9. Due to this symmetrical structure of the segment cage 9, the segment cage 9 can be used as intended in both possible mounting positions, so that incorrect mounting is prevented.

Friction is generated at points and prevents the segment cage 9 from slipping in the partial shell 13 or out of the partial shell 13 in the direction of rotation. The holding members 24 press the mounting rolling element 25 against the partial shell 13. Other solutions are more difficult to adjust in production. However, it is advantageous if the friction is not too high (affects the efficiency of the application) and practically prevents slipping of the segment cage 9 only during the mounting process. After mounting, the anti-slip safeguard and/or mounting safeguard is no longer required. By flattening the holding members 24, the segment cage 9 virtually returns to its original state. Mounting is simplified as the segment cage 9 is designed to be symmetrical. The holding members 24 can be incorporated into existing tools. No new tooling/extensive reworking is necessary. No modification to an existing partial shell 13 is necessary. In the region of the pivot lock 27 on the partial shell 13, additional lugs can still be attached to the cage flange as groove wall sections 31 to prevent the segment cage 9 from moving during transport and mounting. During operation, the lugs should rub off and not affect the function.

REFERENCE NUMERALS

1 Pivot lever arrangement
2 Disc brake
3 Actuator
4 Pivot lever
5 Brake caliper
6a Free end
6b Pivot end
7 Counter-bearing section
8 Segment bearing device
9 Segment cage
10 Rolling elements
11 First race
12 Second race
13 Partial shell
14a,b Side ring region
15a,b End regions
16a,b Guide flanges
17a,b Stop members
18 Lug section
19a,b End web regions
20 Receptacles
21 Intermediate webs
22a,b End webs
23 Mounting receptacle
24 Holding members
25 Mounting rolling element
26 Mating section
27 Pivot lock
28 Groove contour
29 Groove
30 Locking member
31 Groove wall sections
TK1 First partial circle
TK2 Second partial circle

The invention claimed is:

1. A segment bearing device for supporting a first bearing partner relative to a second bearing partner about a pivot axis (S), comprising:

a plurality of rolling elements,
a segment cage for receiving the rolling elements, and
a partial shell, the partial shell providing a race for the rolling elements,
wherein:
at least one of the plurality of rolling elements is arranged, as a mounting rolling element, in a first partial circle (TK1) in an operating state of the segment bearing device and is held in a second partial circle (TK2) in a mounted state of the segment bearing device, the common center point of the first and second partial circles (TK1, TK2) being defined by a center of curvature of the segment cage and the first partial circle (TK1) having a smaller diameter than the second partial circle (TK2).

2. The segment bearing device of claim 1, wherein the mounting rolling element is held in the segment cage in the mounted state by the segment cage in the second partial circle (TK2), wherein in the mounted state at least one, some or the majority of the other rolling elements of the plurality rolling elements are located in the first partial circle (TK1).

3. The segment bearing device of claim 1, wherein the mounting rolling element is clamped in the segment cage in the mounted state.

4. The segment bearing device of claim 1, wherein the partial shell has a mating section, wherein the segment cage is pressed away from the race and against the mating section by the mounting rolling element so that the segment cage is clamped between the race and the mating section.

5. The segment bearing device of claim 1, wherein the segment cage has a plurality of receptacles for the rolling elements, wherein one receptacle of the plurality of receptacles is designed as a mounting receptacle for the mounting rolling element wherein the mounting receptacle has holding members for holding the mounting rolling element in the second partial circle (TK2).

6. The segment bearing device of claim 5, wherein the holding members are designed as holding lugs, wherein the mounting receptacle has at least four such holding lugs or exactly four such holding lugs.

7. The segment bearing device claim 5, wherein the mounting receptacle without the holding members is of identical construction to the other receptacles.

8. The segment bearing device of claim 1, further comprising a pivot lock, wherein the pivot lock has a groove contour on an axial end face of the segment cage and a locking member on the partial shell, which can engage in a locking manner.

9. The segment bearing device of claim 8, wherein the groove contour is separable by the locking member.

10. A pivot lever arrangement for a disc brake comprising:
a pivot lever as a first bearing partner,
a counter-bearing section as a second bearing partner, and
the segment bearing device designed according to claim 1, wherein:
the segment bearing device has a segment cage and a plurality of rolling elements,
the pivot lever is pivotably supported in the counter-bearing section via the segment bearing device.

11. A segment bearing device comprising:
a first partial circle comprising a first center point and a first diameter;
a second partial circle comprising a second center point and a second diameter, larger than the first diameter;
a mounting rolling element held in the first partial circle in an operating state and in the second partial circle in a mounted state;

a segment cage comprising a center of curvature coincident with the first center point and the second center point, the segment cage arranged to receive the mounting rolling element; and a partial shell comprising a race for the mounting rolling element.

12. The segment bearing device of claim 11 further comprising a plurality of rolling elements, wherein:

in the mounting state:

the mounting rolling element is held in the second partial circle by the segment cage; and the plurality of rolling elements are disposed in the first partial circle.

13. The segment bearing device of claim 11, wherein:

in the mounting state, the mounting rolling element is clamped in the segment cage.

14. The segment bearing device of claim 11, wherein:

the partial shell comprises a mating section; and in the mounting state, the mounting rolling element presses the segment cage away from the race and against the mating section, clamping the segment cage between the race and the mating section.

15. The segment bearing device of claim 11, wherein the segment cage comprises a mounting receptacle for the mounting rolling element, the mounting receptacle comprising a holding member for holding the mounting rolling element in the second partial circle.

16. The segment bearing device of claim 15 wherein the segment cage comprises four holding members designed as holding lugs.

17. The segment bearing device of claim 16, wherein the segment cage comprises a plurality of receptacles without the four holding members that are otherwise identical to the mounting receptacle.

18. The segment bearing device of claim 11, further comprising a pivot lock, the pivot lock comprising:

a groove contour on an axial end face of the segment cage; and a locking member on the partial shell, engageable with the groove contour in a locking manner.

19. The segment bearing device of claim 18, wherein the locking member is arranged to separate the groove contour.

20. A pivot lever arrangement for a disc brake, comprising:

the segment bearing device of claim 11 further comprising a plurality of rolling elements;

a pivot lever as a first bearing partner;

a counter-bearing section as a second bearing partner, wherein the pivot lever is pivotably supported in the counter-bearing section via the segment bearing device.

\* \* \* \* \*